(12) United States Patent
Miyazaki et al.

(10) Patent No.: US 11,604,378 B2
(45) Date of Patent: Mar. 14, 2023

(54) DISPLAY DEVICE

(71) Applicant: Japan Display Inc., Tokyo (JP)

(72) Inventors: Go Miyazaki, Tokyo (JP); Shuji Hayashi, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/708,524

(22) Filed: Mar. 30, 2022

(65) Prior Publication Data

US 2022/0317510 A1 Oct. 6, 2022

(30) Foreign Application Priority Data

Mar. 31, 2021 (JP) .............................. JP2021-060755

(51) Int. Cl.
*G02F 1/1335* (2006.01)
*G02B 30/26* (2020.01)
*G02B 30/31* (2020.01)

(52) U.S. Cl.
CPC ....... *G02F 1/133512* (2013.01); *G02B 30/26* (2020.01); *G02B 30/31* (2020.01)

(58) Field of Classification Search
None
See application file for complete search history.

(56) References Cited

U.S. PATENT DOCUMENTS

| | | | | |
|---|---|---|---|---|
| 2006/0114561 A1* | 6/2006 | Mashitani | ............... | H04N 13/31 359/464 |
| 2008/0055500 A1* | 3/2008 | Maeda | ................... | G02B 30/27 348/E13.03 |
| 2013/0070188 A1* | 3/2013 | Ishikawa | ................ | H04N 13/31 349/110 |
| 2013/0335385 A1* | 12/2013 | Kim | ....................... | H04N 13/31 345/204 |
| 2014/0098205 A1* | 4/2014 | Usukura | ................ | G02B 30/27 348/59 |
| 2019/0187484 A1* | 6/2019 | Koito | ..................... | G02B 30/32 |
| 2019/0353916 A1 | 11/2019 | Koito et al. | | |

FOREIGN PATENT DOCUMENTS

JP 2019-078852 A 5/2019
JP 2019-204075 A 11/2019

* cited by examiner

*Primary Examiner* — Shan Liu
(74) *Attorney, Agent, or Firm* — K&L Gates LLP (57) ABSTRACT

A display device includes a light source, a liquid crystal panel including a first sub-pixel and a second sub-pixel adjacent to the first sub-pixel in a first direction, and an optical control element including a light shielding layer. Each of the first sub-pixel and the second sub-pixel has a first width in the first direction. The light shielding layer includes an opening portion having a second width in the first direction. The second width is 1.5 times the first width. In all of light rays irradiated from the light source and transmitting through the opening portion, an angle between a first light ray transmitting through the first sub-pixel and emitted to an outside and the second light ray transmitting through the second sub-pixel and emitted to the outside is less than or equal to 2 degrees.

12 Claims, 6 Drawing Sheets

DISPLAY DEVICE

CROSS REFERENCE TO RELATED APPLICATIONS

This application is based on and claims the benefit of priority from the prior Japanese Patent Application No. 2021-60755, filed on Mar. 31, 2021, the entire contents of which are incorporated herein by reference.

BACKGROUND OF THE INVENTION

Field

One embodiment of the present invention relates to a display device that enables stereoscopic viewing with the naked eye.

Description of the Related Art

In recent years, various display devices that enable stereoscopic viewing with the naked eye have been developed (for example, see Japanese Patent Application Laid-Open No. 2019-78852 and Japanese Patent Application Laid-Open No. 2019-204075). In such a display device, there is a demand for a more natural display of a three-dimensional image. Specifically, high brightness of the display device, smooth switching of the 3D image when the viewpoint direction of the 3D image is moved, and depth of field that makes the image appear three-dimensional is required for the display quality of the display device that enables stereoscopic viewing.

SUMMARY OF THE INVENTION

A display device according to one embodiment of the present invention includes a light source, a liquid crystal panel comprising a first sub-pixel and a second sub-pixel adjacent to the first sub-pixel in a first direction, and an optical control element comprising a light-shielding layer. Each of the first sub-pixel and the second sub-pixel has a first width in the first direction. The light shielding layer includes an opening portion having a second width in the first direction. The second width is 1.5 times the first width. In all of light rays irradiated from the light source and transmitting through the opening portion, an angle between a first light ray transmitting through the first sub-pixel and emitted to an outside and the second light ray transmitting through the second sub-pixel and emitted to the outside is less than or equal to 2 degrees.

Further, a display device according to one embodiment of the present invention includes a light source, a liquid crystal panel including a first sub-pixel and a second sub-pixel adjacent to the first sub-pixel in a first direction, and an optical control element comprising a light shielding layer. The liquid crystal panel is located between the light source and the optical control element. Each of the first sub-pixel and the second sub-pixel has a first width in the first direction. The light-shielding layer includes an opening portion having a second width in the first direction The second width is 1.5 times the first width. In all of light rays irradiated from the light source and transmitting through the opening portion, an angle between a first light ray transmitting through the first sub-pixel and emitted to an outside and the second light ray transmitting through the second sub-pixel and emitted to the outside is less than or equal to 2 degrees.

Furthermore, a display device according to one embodiment of the present invention includes a light source, a liquid crystal panel comprising a first sub-pixel and a second sub-pixel adjacent to the first sub-pixel in a first direction, and an optical control element comprising a light-shielding layer. The optical control element is located between the light source and the liquid crystal panel. Each of the first sub-pixel and the second sub-pixel has a first width in the first direction. The light shielding layer comprises an opening portion having a second width in the first direction. The second width is 1.5 times the first width. In all of light rays irradiated from the light source and transmitting through the opening portion, an angle between a first light ray transmitting through the first sub-pixel and emitted to an outside and the second light ray transmitting through the second sub-pixel and emitted to the outside is less than or equal to 2 degrees.

DESCRIPTION OF EMBODIMENTS

In general, the above-mentioned characteristics are in a trade-off relationship. For example, when the opening of the optical control element (barrier film) is small or the density of light rays transmitting through the opening of the optical control element is increased in order to improve the depth of field, this results in lower brightness, narrower viewing angle, or lower resolution. Therefore, it is very difficult to balance the display quality in the display device that enables stereoscopic viewing.

In view of the above problems, one of the objects of an embodiment of the present invention is to provide a display device with improved display quality of a three-dimensional image.

Hereinafter, embodiments of the present invention are described with reference to the drawings. Each of the embodiments is merely an example, and a person skilled in the art could easily conceive of the invention by appropriately changing the embodiment while maintaining the gist of the invention, and such changes are naturally included in the scope of the invention. For the sake of clarity of the description, the drawings may be schematically represented with respect to the widths, thicknesses, shapes, and the like of the respective portions in comparison with actual embodiments. However, the illustrated shapes are merely examples and are not intended to limit the interpretation of the present invention.

The expressions "a includes A, B or C", "a includes any of A, B and C", "a includes one selected from the group consisting of A, B and C", and "a includes one selected from the group consisting of A, B and C" do not exclude the case where a includes a plurality of combinations of A to C unless otherwise specified. Furthermore, these expressions do not exclude the case where a includes other elements.

In the present specification, although the phrase "above" or "above direction" or "below" or "below direction" is used for convenience of explanation, in principle, the direction from a substrate toward a structure is referred to as "above" or "above direction" with reference to a substrate in which the structure is formed. Conversely, the directions from the structure to the substrate are "below" or "below direction". Therefore, in the expression of the structure over the substrate, one surface of the structure facing the substrate is the bottom surface of the structure and the other surface is the top surface of the structure. In addition, the expression "the structure over the substrate" only explains the vertical relationship between the substrate and the structure, and another member may be placed between the substrate and the structure. Furthermore, the terms "above" or "above direction" or "below" or "below direction" mean the order of stacked layers in the structure in which a plurality of layers are stacked, and may not be related to the position in which layers are superimposed in a plan view.

In the present invention, when one film is processed to form multiple films, these multiple films may have different functions or roles. However, these multiple films are derived from the same film formed as the same layer in the same process and have the same structure or the same material. Therefore, these multiple films are defined as being in the same layer.

First Embodiment

A display device 10 according to an embodiment of the present invention is described with reference to FIGS. 1 to 4.

[1. Configuration of Display Device 10]

Figure 1:
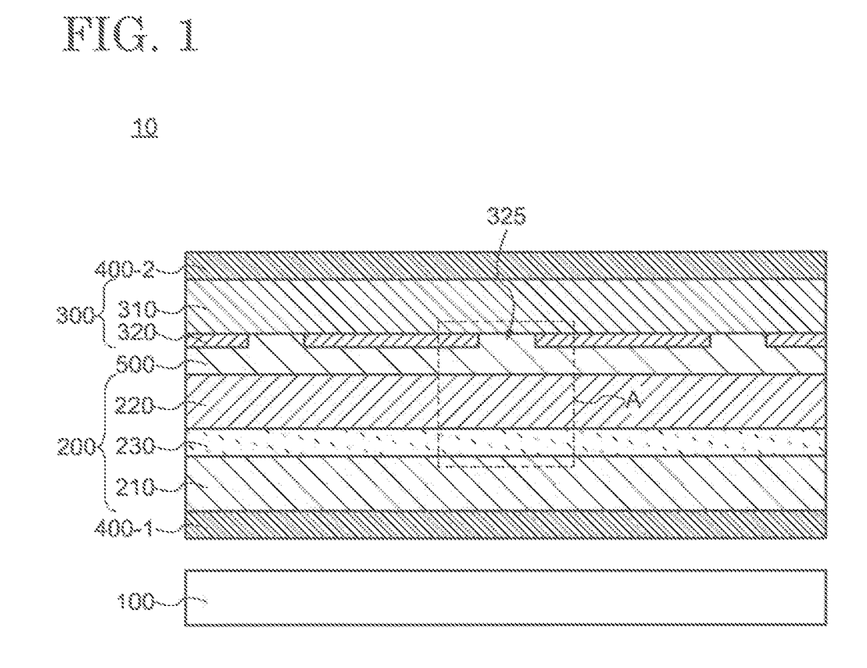
FIG. 1 is a schematic cross-sectional view of a display device according to an embodiment of the present invention.

FIG. 1 is a schematic cross-sectional view of a display device 10 according to an embodiment of the present invention. As shown in FIG. 1, the display device 10 includes a light source 100, a liquid crystal panel 200, an optical control element 300, a first polarizing plate 400-1, a second polarizing plate 400-2, and an adhesive member 500. In the display device 10, the liquid crystal panel 200 is arranged between the light source 100 and the optical control element 300.

Specifically, the first polarizing plate 400-1 and the second polarizing plate 400-2 are provided on one surface of the liquid crystal panel 200 and one surface of the optical control element 300, respectively. Further, the other surface of the liquid crystal panel 200 and the other surface of the optical control element 300 are bonded to each other via the adhesive member 500. That is, the liquid crystal panel 200, the adhesive member 500, and the optical control element 300 are sequentially provided between the first polarizing plate 400-1 and the second polarizing plate 400-2. Furthermore, the light source 100 is arranged on the side of the first polarizing plate 400-1. The light emitted from the light source 100 transmits through the first polarizing plate 400-1, the liquid crystal panel 200, the adhesive member 500, the optical control element 300, and the second polarizing plate 400-2 in this order, and is emitted to the outside.

The light source 100 is a so-called backlight. For example, a cold cathode fluorescent lamp, a light emitting diode (LED), a laser, or the like can be used as the light source 100.

The liquid crystal panel 200 includes a first substrate 210, a second substrate 220, and a liquid crystal layer 230. Although the details are omitted, the first substrate 210 is provided with a circuit for driving the liquid crystal of the liquid crystal layer 230. Therefore, the first substrate 210 can be said to be a circuit substrate. Further, although the details are omitted, the second substrate 220 is provided with a color filter. Therefore, the second substrate 220 can be said to be a color filter substrate. The second substrate 220 preferably includes a red color filter, a green color filter, and a blue color filter in order to perform full-color display.

Electrodes for driving the liquid crystal of the liquid crystal layer 230 may be provided only on the first substrate 210, or may be provided on the first substrate 210 and the second substrate 220. Further, the first substrate 210 or the second substrate 220 may be provided with an alignment film for aligning the liquid crystal of the liquid crystal layer 230. The alignment film on which a rubbing treatment or a light irradiation treatment is performed can align the liquid crystal in a specific direction.

The optical control element 300 includes a base material 310 and a light shielding layer 320 on the base material 310. The base material 310 has translucency and can support the light shielding layer 320. The light shielding layer 320 can block light transmitting through the liquid crystal panel 200. However, the light shielding layer 320 includes a plurality of openings 325. In the openings 325, light transmitting through the liquid crystal panel 200 can be transmitted. For example, a metal material containing chromium (Cr), molybdenum (Mo), or silver (Ag), a black resin material, or the like can be used for the light shielding layer 320. As described above, the light shielding layer 320 is configured to block light, and the light shielding layer 320 may reflect or absorb light.

Returning to the explanation of the relationship between the arrangement of the liquid crystal panel 200 and the optical control element 300, the first polarizing plate 400-1 and the second polarizing plate 400-2 are in contact with the first base material 210 of the liquid crystal panel 200 and the base material 310 of the control element 300, respectively. Further, the adhesive member 500 is in contact with the second substrate 220, fills the inside of the openings 325, and is in contact with the light shielding layer 320 and the base material 310.

For example, an adhesive such as an ultraviolet curable resin or a thermosetting resin can be used for the adhesive member 500.

In addition, the liquid crystal panel 200 and the optical control element 300 is described with reference to FIG. 2.

Figure 2:
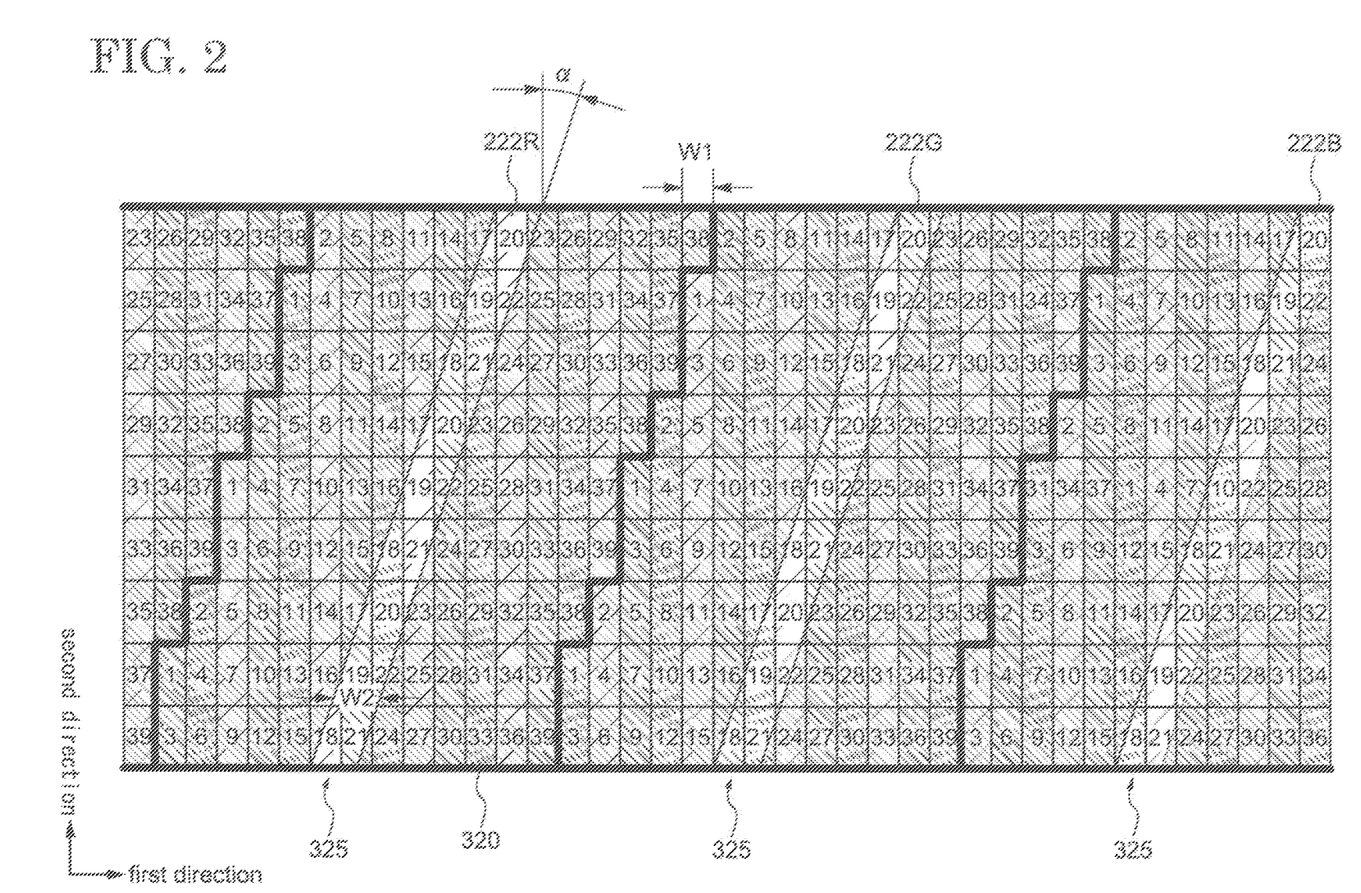
FIG. 2 is a schematic plan view of the display device according to an embodiment of the present invention.

FIG. 2 is a schematic plan view of the display device 10 according to the embodiment of the present invention. Specifically, FIG. 2 is a plan view illustrating the relationship between sub-pixels of the liquid crystal panel 200 and an arrangement of the light shielding layer 320 and the openings 325 of the optical control element 300. As shown in FIG. 2, the liquid crystal panel 200 includes a plurality of red sub-pixels 222R, a plurality of green sub-pixels 222G, and a plurality of blue sub-pixels 222B. In the first direction, the red sub-pixel 222R, the green sub-pixel 222G, and the blue sub-pixel 222B are repeatedly arranged in this order. Further, in the second direction orthogonal to the first direction, the plurality of red sub-pixels 222R, the plurality of green sub-pixels 222G, and the plurality of blue sub-pixels 222B are arranged in a straight line, respectively. That is, one red sub-pixel 222R is adjacent to the blue sub-pixel 222B and the green sub-pixel in the first direction, and is adjacent to the other red sub-pixel 222R in the second direction. The same configuration is applied to the green sub-pixel 222G and the blue sub-pixel 222B.

In the following description, when colors of the sub-pixels are not particularly distinguished, they may be described as the sub-pixel 222. Therefore, the two adjacent sub-pixels 222 in the first direction may refer to any of two sub-pixels 222 selected from the red sub-pixel 222R, the green sub-pixel 222G, and the blue sub-pixel 222B.

In FIG. 2, the numbers illustrated in the red sub-pixel 222R, the green sub-pixel 222G, and the blue sub-pixel 222B show the viewpoints from which light transmitting through the sub-pixel 222 is observed. That is, light transmitting through the sub-pixel 222 illustrated with the same number is refracted at the same angle and observed from the same viewpoint. Further, the light ray transmitting through one opening 325 can be considered as a repetition of a single unit surrounded by a thick line. The single unit includes 39 red sub-pixels 222R, green sub-pixels 222G, and blue sub-pixels 222B, respectively. That is, the single unit includes a total of 117 (=39×3) sub-pixels 222. The number of sub-pixels 222 included in the single unit is not particularly limited.

The light shielding layer 320 overlaps the plurality of sub-pixels 222. Further, as described above, the light shielding layer 320 is provided with an opening portion 325. The opening portion 325 extends linearly in a direction intersecting the first direction. Specifically, the opening portion 325 extends with an inclination angle α of 12.5 degrees from the second direction. In the first direction, the width W2 of the opening portion 325 is 1.5 times the width W1 of the sub-pixel 222. Although the details are described later, when the width W2 of the opening portion 325 is 1.5 times the width W1 of the sub-pixel 222, the display quality of the three-dimensional image of the display device 10 is improved.

Here, a light ray transmitting through the opening portion 325 is described with reference to FIG. 3.

Figure 3:
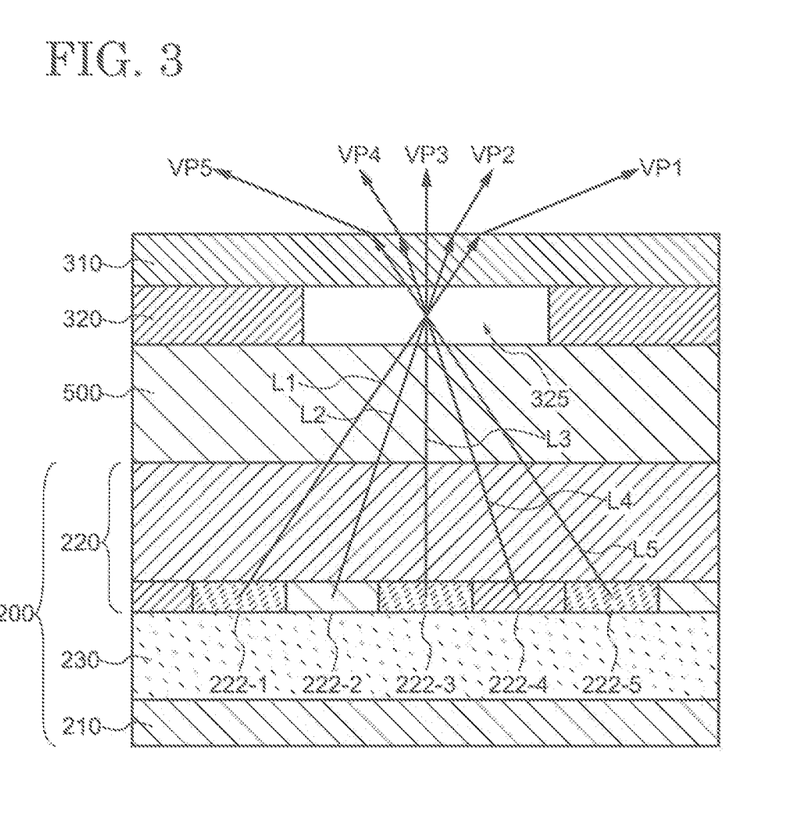
FIG. 3 is a schematic partially enlarged cross-sectional view of a display device according to an embodiment of the present invention.

FIG. 3 is a schematic partially enlarged cross-sectional view of the display device 10 according to the embodiment of the present invention. Specifically, FIG. 3 is a partially enlarged view of a region A shown in FIG. 1.

Although the light rays emitted from the light source 100 transmit through the sub-pixel 222, the light rays are controlled by the optical control element 300, and only the light rays transmitting through the predetermined sub-pixel 222 are emitted to the outside. For example, as shown in FIG. 3, the first light ray L1 to the fifth light ray L5 transmitting through the first sub-pixel 222-1 to the fifth sub-pixel 222-5 transmit through the opening portion 325 and are emitted to the exterior of the device 10. At this time, although the first ray L1 to the fifth ray L5 are refracted by each element, for the sake of brevity in FIG. 3, it is described that all the refractions are reflected when they are emitted from the base material 310.

The first ray L1 to the fifth ray L5 can be observed from the first viewpoint VP1 to the fifth viewpoint VP5 outside the display device 10, respectively. The third sub-pixel 222-3 is located directly below the center line of the opening portion 325. Therefore, the third ray L3 transmitting through the third sub-pixel 222-3 is observed at the third viewpoint VP3 with almost no refraction. The second sub-pixel 222-2 and the fourth sub-pixel are adjacent to the third sub-pixel 222-3. The second ray L2 and the fourth ray L4 transmitting through the second sub-pixel 222-2 and the fourth sub-pixel 222-4 are observed at the second viewpoint VP2 and the fourth viewpoint VP4, respectively, with refraction because the second sub-pixel 222-2 and the fourth sub-pixel 222-4 are apart from the center line of the opening portion 325. The first sub-pixel 222-1 and the fifth sub-pixel 222-5 are adjacent to the second sub-pixel 222-2 and the fourth sub-pixel 222-4, respectively. The first ray L1 and the fifth ray L5 transmitting through the first sub-pixel 222-1 and the fifth sub-pixel 222-5 are observed at the first viewpoint VP1 and the fifth viewpoint VP5, respectively, with refraction because the first sub-pixel 222-1 and the fifth sub-pixel 222-5 are apart from the center line of the opening portion 325.

Figure 4A:
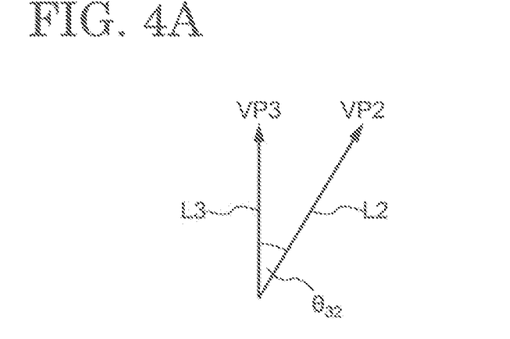
FIG. 4A is a schematic diagram illustrating an angle formed by two adjacent light rays observed in a display device according to an embodiment of the present invention.
Figure 4B:
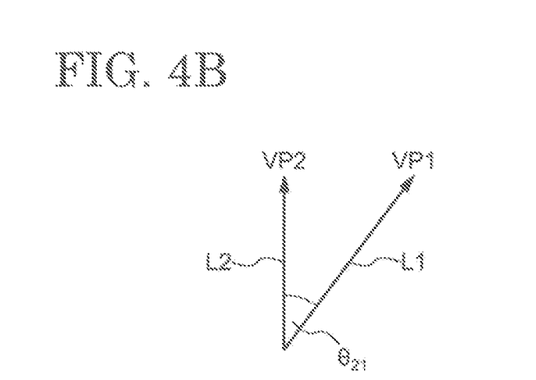
FIG. 4B is a schematic diagram illustrating an angle formed by two adjacent light rays observed in a display device according to an embodiment of the present invention.

FIGS. 4A and 4B are schematic views illustrating an angle θ formed by two adjacent light rays observed in the display device 10 according to the embodiment of the present invention. As shown in FIG. 4A, an angle formed by the second ray L2 observed at the second viewpoint VP2 with respect to the third ray L3 observed at the third viewpoint VP3 is defined as $\theta_{32}$. Further, as shown in FIG. 4B, an angle formed by the first ray L1 observed at the first viewpoint VP1 with respect to the second ray L2 observed at the second viewpoint VP2 is defined as $\theta_{21}$. Since the second ray L2 is refracted and the first ray L1 is refracted more than the second ray L2, the angle $\theta_{21}$ is larger than the angle $\theta_{32}$. That is, the farther the position of the sub-pixel 222 is from the center line of the opening portion 325, the larger the angle θ formed by the two adjacent light rays observed. In the display device 10, the angle θ formed by the two adjacent rays observed in all the rays that are emitted from the light source 100 and transmitting through the opening portion 325 is less than or equal to 2 degrees. Further, the conditions of each element (for example, the distance between the liquid crystal panel 200 and the optical control element 300, the refractive index of the adhesive member 500, or the thickness of the substrate 310) is set, so that the angle θ formed by the two adjacent light rays observed is less than or equal to 2 degrees. When the width W2 of the opening portion 325 is 1.5 times the width W1 of the sub-pixel 222 and the angle θ formed by the two adjacent light rays observed is less than or equal to 2 degrees, the display quality of the three-dimensional image is improved. Therefore, the above ranges are preferable.

[2. Brightness Measurement of Display Device 10]

The display device 10 was fabricated so that the width W2 of the opening portion 325 of the optical control element 300 is 1.5 times the width W1 of the sub-pixel 222, and the angle θ formed by two adjacent light rays observed is less than or equal to 2 degrees, and then, the brightness was measured.

Figure 5:
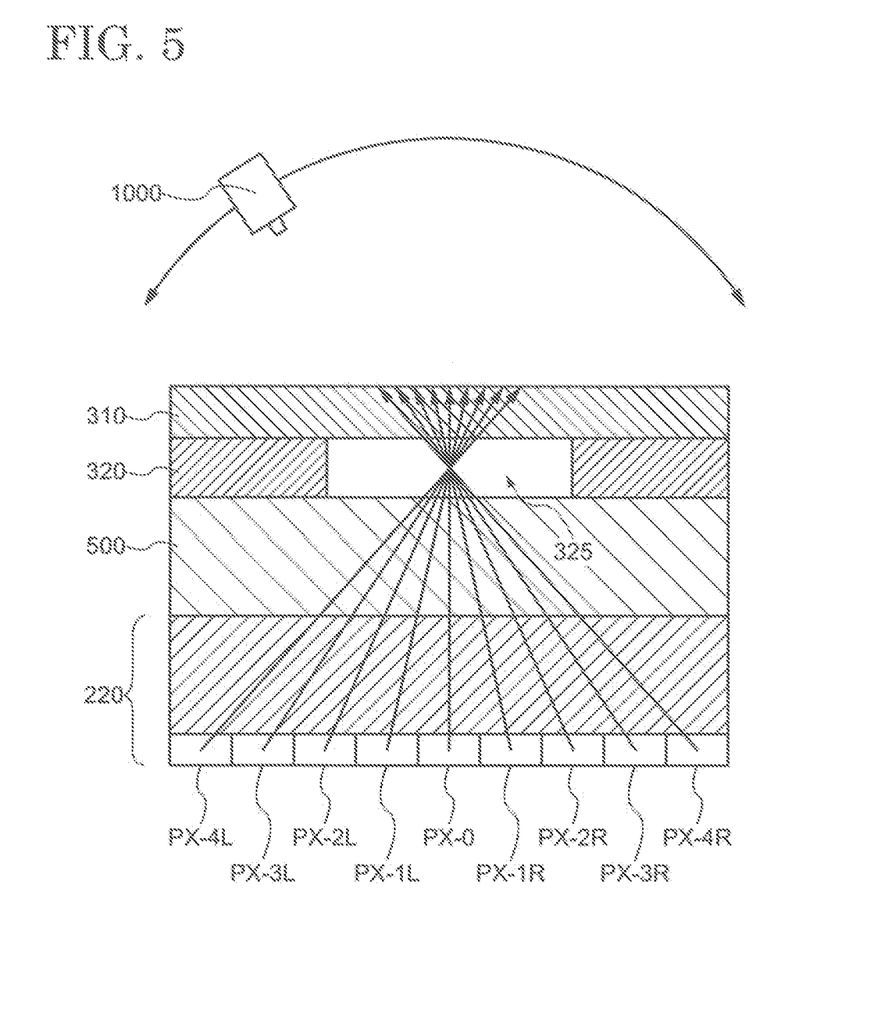
FIG. 5 is a schematic diagram illustrating a measurement of brightness in a display device according to an embodiment of the present invention.

FIG. 5 is a schematic diagram illustrating a measurement of the brightness in the display device 10 according to the embodiment of the present invention. In this measurement, for convenience, the light rays from one red sub-pixel 222R, one green sub-pixel 222G, and one blue sub-pixel 222B were controlled to transmit, and the brightness of white light was measured. Hereinafter, one red sub-pixel 222R, one green sub-pixel 222G, and one blue sub-pixel 222B are described as one pixel PX.

The angle dependence of the brightness of the transmitted light rays was measured for each pixel PX using the LCD evaluation device 1000 (LCD-5200, manufactured by Otsuka Electronics Co., Ltd.), and the brightness of the light rays transmitting through the adjacent sub-pixels was calculated with respect to the viewpoint from which light rays transmitting through the pixel PX-0 was observed. The pixel PX-1L and the pixel PX-1R are sub-pixels most adjacent to the pixel PX-0. The pixel PX-2L and pixel PX-2R are sub-pixels second adjacent to pixel PX-0. The pixel PX-3L and pixel PX-3R are sub-pixels third adjacent to pixel PX-0. The pixel PX-4L and pixel PX-4R are sub-pixels fourth adjacent to pixel PX-0.

Table 1 shows the ratio (%) of the brightness of the light rays transmitting through each pixel PX with respect to the total brightness of the light rays transmitting through all the pixels when the viewpoint in the normal direction (0 degrees) of the display surface of the display device 10 (or the surface of the optical control element 300) is used as a reference. Further, Table 2 shows the ratio (%) of the brightness of the light rays transmitting through each PX with respect to the total brightness of the light rays transmitting through all the pixels when the viewpoint inclined by 64 degrees from the normal direction of the display surface of the display device 10 (or the surface of the optical control element 300) is used as a reference.

TABLE 1

| PX-0 | PX-1L | PX-1R | PX-2L | PX-2R | PX-3L | PX-3R | PX-4L | PX-4R |
|---|---|---|---|---|---|---|---|---|
| 21.9 | 19.6 | 19.9 | 12.8 | 13.1 | 5.0 | 4.9 | 1.6 | 1.2 |

TABLE 2

| PX-0 | PX-1L | PX-1R | PX-2L | PX-2R | PX-3L | PX-3R | PX-4L | PX-4R |
|---|---|---|---|---|---|---|---|---|
| 17.2 | 19.4 | 12.2 | 18.2 | 6.9 | 13.6 | 3.2 | 8.1 | 1.2 |

As can be seen from Tables 1 and 2, in each case, the ratio of the brightness of the light rays (main light rays) transmitting through the pixel PX-0 corresponding to the reference viewpoint was less than or equal to 50(%). Further, in this case, it was found that the amount of change in the ratio of the light rays transmitting through the pixel PX-0 was small even when the viewpoint was changed, and the three-dimensional image was smoothly switched by the movement in the viewpoint direction.

Therefore, in the display device 10, the ratio of the brightness of the light rays (main light rays) transmitting through the pixels corresponding to the reference viewpoint with one viewpoint as the reference with respect to the total brightness of all the light rays transmitting through the opening portion 325 is preferably 50%.

[3. Evaluation of Display Device 10]

Samples of the display device 10 were fabricated so that the width W2 of the opening portion 325 of the optical control element 300 and the angle θ formed by the two adjacent light rays observed are set to predetermined values, and the display quality of the three-dimensional image was evaluated. Table 3 shows the fabrication conditions and evaluations of nine samples. In Table 3, Evaluation 1 is an evaluation item for brightness, Evaluation 2 is an evaluation item for image switching, and Evaluation 3 is an evaluation item for depth of field. In Table 3, items with improved display quality were evaluated as "o", items with almost no change in display quality were evaluated as "Δ", and items with deteriorated display quality were evaluated as "x".

TABLE 3

| No. | width W2 (times) | angle θ (degrees) | viewing angle (degrees) | Evaluation 1 | Evaluation 2 | Evaluation 3 |
|---|---|---|---|---|---|---|
| 1 | 2 | ≤2.05 | 140 | o | Δ | x |
| 2 | 2 | ≤1.49 | 100 | o | o | x |
| 3 | 2 | ≤1.19 | 80 | o | o | Δ |
| 4 | 1.5 | ≤2.05 | 140 | Δ | Δ | Δ |
| 5 | 1.5 | ≤1.49 | 100 | Δ | o | o |
| 6 | 1.5 | ≤1.19 | 80 | Δ | o | o |
| 7 | 1 | ≤2.05 | 140 | x | Δ | Δ |
| 8 | 1 | ≤1.49 | 100 | x | o | o |
| 9 | 1 | ≤1.19 | 80 | x | o | o |

In sample Nos. 1 to 3 in which the width W2 of the opening portion 325 of the optical control element is twice the width W1 of the sub-pixel 222, a deterioration in display quality was observed in the evaluation of the depth of field (Evaluation 3). In sample No. 3, although the display quality did not deteriorate so much, it was not suitable for practical use because the viewing angle was as narrow as 80 degrees.

In sample Nos. 7 to 9 in which the width W2 of the opening portion 325 of the optical control element 300 is 1 times the width W1 of the sub-pixel 222, a decrease in brightness was observed in all samples (see Evaluation 1).

In sample Nos. 4 to 6 in which the width W2 of the opening portion 325 of the optical control element 300 is 1.5 times the width W1 of the sub-pixel 222, the result obtained in any of the evaluation was that there was no change in the display quality or the display quality was improved. In particular, the sample No. 5 in which the angle θ formed by the two adjacent rays observed was less than or equal to 2 degrees was found to have excellent display quality of the three-dimensional image.

As described above, in the display device 10, the width W2 of the opening portion 325 is 1.5 times the width W1 of the sub pixel 222. Further, the angle θ formed by two adjacent light rays observed outside the display device 10 is less than or equal to 2 degrees. At this time, it was found that the display quality of the three-dimensional image of the display device 10 was improved. Therefore, in the display device 10, the width W2 of the opening portion 325 and the angle θ formed by the two adjacent rays to be observed are set, and then the fabrication conditions of each element can be controlled to balance the display quality of the three-dimensional display.

Second Embodiment

A display device 10A according to an embodiment of the present invention is described with reference to FIG. 6. When the configuration of the display device 10A is the same as the configuration of the display device 10, the description thereof may be omitted.

Figure 6:
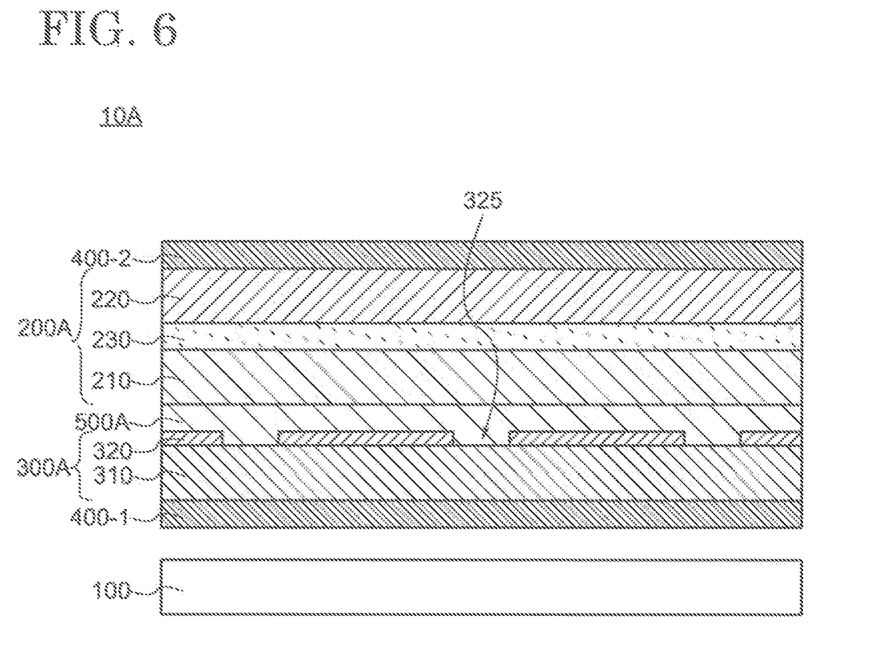
FIG. 6 is a schematic cross-sectional view of a display device according to an embodiment of the present invention.

FIG. 6 is a schematic cross-sectional view of the display device 10A according to the embodiment of the present invention. As shown in FIG. 6, the display device 10A includes a light source 100, an optical control element 300A, a liquid crystal panel 200A, a first polarizing plate 400-1, a second polarizing plate 400-2, and an adhesive member 500A.

The display device 10A is the same as the display device 10 in terms of the arrangement of the light source 100, the first polarizing plate 400-1 and the second polarizing plate 400-2. However, in the display device 10A, the arrangement of the optical control element 300A, the liquid crystal panel 200A, and the adhesive member 500A between the first polarizing plate 400-1 and the second polarizing plate 400-2 is different from that of the display device 10. In the display device 10A, the optical control element 300A is arranged between the light source 100 and the liquid crystal panel 200A.

In the display device 10A, the first polarizing plate 400-1 and the second polarizing plate 400-2 are provided on one surface of the optical control element 300A and one surface of the liquid crystal panel 200A, respectively. Further, the other surface of the liquid crystal panel 200 and the other surface of the optical control element 300 are bonded to each other via the adhesive member 500. Specifically, the first polarizing plate 400-1 and the second polarizing plate 400-2 are in contact with the base material 310 of the optical control element 300A and the second substrate 220 of the liquid crystal panel 200A, respectively. Further, the adhesive member 500A is in contact with the first substrate 210, fills the opening portion 325, and is in contact with the light shielding layer 320 and the base material 310.

Also in the display device 10A, the width W2 of the opening portion 325 is 1.5 times the width W1 of the sub-pixel 222. Further, the angle θ formed by two adjacent light rays observed outside the display device 10A is less than or equal to 2 degrees. Therefore, the display quality of the three-dimensional image of the display device 10A is improved.

Each of the embodiments described above as an embodiment of the present invention can be appropriately combined and implemented as long as they do not contradict each other. Additions, deletion, or design changes of constituent elements, or additions, omissions, or changes to conditions of steps as appropriate based on a display device of the respective embodiments are also included within the scope of the present invention as long as the gist of the present invention is provided.

Other effects of the action which differ from those brought about by each of the above described embodiments, but which are apparent from the description herein or which can be readily predicted by those skilled in the art, are naturally understood to be brought about by the present invention.

What is claimed is:

1. A display device comprising:
a light source;
a liquid crystal panel comprising a first sub-pixel and a second sub-pixel adjacent to the first sub-pixel in a first direction; and
an optical control element comprising a light shielding layer,
wherein each of the first sub-pixel and the second sub-pixel has a first width in the first direction,
the light shielding layer comprises an opening portion having a second width in the first direction,
the second width is 1.5 times the first width, and
in all of light rays irradiated from the light source and transmitting through the opening portion, an angle between a first light ray transmitting through the first sub-pixel and emitted to an outside and the second light ray transmitting through the second sub-pixel and emitted to the outside is less than or equal to 2 degrees.

2. The display device according to claim 1, wherein a ratio of a brightness of the first light ray to a total brightness of all of the light rays transmitting through the opening portion is less than or equal to 50%.

3. The display device according to claim 1, wherein the opening portion extends linearly in a direction intersecting the first direction.

4. The display device according to claim 3, wherein the direction in which the opening portion extends is inclined by 12.5 degrees from a direction orthogonal to the first direction.

5. A display device comprising:
a light source;
a liquid crystal panel comprising a first sub-pixel and a second sub-pixel adjacent to the first sub-pixel in a first direction; and
an optical control element comprising a light shielding layer,
wherein the liquid crystal panel is located between the light source and the optical control element,
each of the first sub-pixel and the second sub-pixel has a first width in the first direction,
the light shielding layer comprises an opening portion having a second width in the first direction,
the second width is 1.5 times the first width, and
in all of light rays irradiated from the light source and transmitting through the opening portion, an angle between a first light ray transmitting through the first sub-pixel and emitted to an outside and the second light ray transmitting through the second sub-pixel and emitted to the outside is less than or equal to 2 degrees.

6. The display device according to claim 5, wherein a ratio of a brightness of the first light ray to a total brightness of all of the light rays transmitting through the opening portion is less than or equal to 50%.

7. The display device according to claim 5, wherein the opening portion extends linearly in a direction intersecting the first direction.

8. The display device according to claim 7, wherein the direction in which the opening portion extends is inclined by 12.5 degrees from a direction orthogonal to the first direction.

9. A display device comprising:
a light source;
a liquid crystal panel comprising a first sub-pixel and a second sub-pixel adjacent to the first sub-pixel in a first direction; and
an optical control element comprising a light shielding layer,
wherein the optical control element is located between the light source and the liquid crystal panel,
each of the first sub-pixel and the second sub-pixel has a first width in the first direction,
the light shielding layer comprises an opening portion having a second width in the first direction,
the second width is 1.5 times the first width, and
in all of light rays irradiated from the light source and transmitting through the opening portion, an angle between a first light ray transmitting through the first sub-pixel and emitted to an outside and the second light ray transmitting through the second sub-pixel and emitted to the outside is less than or equal to 2 degrees.

10. The display device according to claim 9, wherein a ratio of a brightness of the first light ray to a total brightness of all of the light rays transmitting through the opening portion is less than or equal to 50%.

11. The display device according to claim 9, wherein the opening portion extends linearly in a direction intersecting the first direction.

12. The display device according to claim 11, wherein the direction in which the opening portion extends is inclined by 12.5 degrees from a direction orthogonal to the first direction.

* * * * *